US006541595B2

(12) United States Patent
Panandiker et al.

(10) Patent No.: US 6,541,595 B2
(45) Date of Patent: Apr. 1, 2003

(54) POWDER COATINGS BASED ON BRANCHED OLIGOESTERS AND NON-EMISSIVE URETDIONE POLYISOCYANATES

(75) Inventors: Kamlesh Pai Panandiker, Excelsior, MN (US); John Michael Bronk, Woodstock; Franklin Paul Spitler, Algonquin, both of IL (US)

(73) Assignee: McWhorter Technologies Inc., Carpentersville, IL (US)

( * ) Notice: Subject to any disclaimer, the term of this patent is extended or adjusted under 35 U.S.C. 154(b) by 0 days.

(21) Appl. No.: 09/867,269

(22) Filed: May 29, 2001

(65) Prior Publication Data

US 2002/0091206 A1 Jul. 11, 2002

Related U.S. Application Data

(63) Continuation of application No. 09/156,254, filed on Sep. 18, 1998, now Pat. No. 6,255,523.

(51) Int. Cl.[7] .................. C09D 175/06; C08L 75/06; C08G 18/42; C08G 18/79; C08G 18/80
(52) U.S. Cl. .............. 528/45; 525/440; 528/73; 528/80; 528/81; 528/83
(58) Field of Search ................ 525/440; 528/45, 528/73, 80, 81, 83

(56) References Cited

U.S. PATENT DOCUMENTS

| 3,721,645 | A | * | 3/1973 | Zemlin | 524/91 |
|---|---|---|---|---|---|
| 3,857,818 | A | * | 12/1974 | Frizelle | 525/124 |
| 4,197,353 | A | * | 4/1980 | Tobias et al. | 428/458 |
| 4,375,539 | A | * | 3/1983 | McBride et al. | 528/288 |
| 4,413,079 | A | * | 11/1983 | Disteldorf et al. | 524/169 |
| 4,442,270 | A | * | 4/1984 | Passmore et al. | 525/440 |
| 4,482,721 | A | * | 11/1984 | Wegner et al. | 548/262 |
| 5,243,013 | A | * | 9/1993 | Hurnik et al. | 528/80 |
| 5,523,377 | A | * | 6/1996 | Konig et al. | 528/45 |
| 5,580,660 | A | | 12/1996 | Witte et al. | 428/422.8 |
| 5,587,428 | A | * | 12/1996 | Jones et al. | 525/165 |
| 5,610,263 | A | * | 3/1997 | Jones et al. | 528/272 |
| 5,621,064 | A | * | 4/1997 | Laas et al. | 528/60 |
| 5,637,654 | A | * | 6/1997 | Panandiker et al. | 525/437 |
| 5,641,854 | A | * | 6/1997 | Jones et al. | 528/128 |
| 5,847,044 | A | | 12/1998 | Laas et al. | 524/590 |
| 5,910,563 | A | * | 6/1999 | Jones et al. | 528/272 |
| 5,955,550 | A | * | 9/1999 | Jones et al. | 525/440 |
| 6,255,523 | B1 | * | 7/2001 | Panandiker et al. | 560/127 |

* cited by examiner

Primary Examiner—Rabon Sergent
(74) Attorney, Agent, or Firm—Fitch, Even, Tabin & Flannery

(57) ABSTRACT

The present invention relates to powder coating compositions which can be cured at low temperatures. The powder coating composition of the invention include a unique combination of a branched oligoester polyol and uretdione crosslinking agent which when cured results in a coating binder with desirable hardness, flexibility, solvent resistance, corrosion resistance, weatherability and gloss.

26 Claims, No Drawings

POWDER COATINGS BASED ON BRANCHED OLIGOESTERS AND NON-EMISSIVE URETDIONE POLYISOCYANATES

This is a continuation, of prior application No. 09/156,254, filed Sep. 18, 1998, now U.S. Pat. No. 6,255,523, which is hereby incorporated herein by reference in its entirety.

The present invention relates to powder coating compositions which can be cured at low temperatures either with or without the use of a urethane catalyst. ore particularly, the present invention relates to branched hydroxyl terminated oligoesters which when crosslinked provide improved performance properties at low curing temperatures and which do not release blocking agents from crosslinker into the environment.

BACKGROUND OF THE INVENTION

Thermosetting powder coating compositions are well known in the art and are widely used as coatings for electric appliances, bicycles, garden furniture, accessories for the automotive industry, general metal parts and the like. Thermosetting powders consist of a mixture of a primary resin and one or more crosslinkers, often called hardeners or curing agents. The general approach associated with powder coating technology is to formulate a coating from solid components, mix them, disperse pigments (and other insoluble components) in a matrix of the major binder components, and pulverize the formulation into a powder. In so far as possible, each particle contains all of the ingredients in the formulation. The powder is applied to the substrate, usually but not limited to a metal, and fused to a continuous film by baking.

Compositions which include organic polyhydroxy compounds and blocked to include internal or self-blocked polyisocyanates and which are solid at room temperature, are important binding agents for thermally cross-linkable powder coatings (see for example, U.S. Pat. Nos. 3,857,818 and 4,375,539). Common to these Systems is the disadvantage that, during thermal cross-linking, the compounds used as blocking agents, excluding self/internal blocked agents, are split off and escape into the environment. Therefore, during cure and crosslinking special precautions must be taken to purify the waste air and/or to recover the blocking agent for reasons of ecology and work hygiene.

The elimination of emissions from the curing of powder coatings has been attempted with the use of blocking-agent-free, uretdione-group-containing polyurethane (PUR) powder coating hardeners. In these compositions cross-linking takes place with thermal cleaving of the uretdione groups. (See for example U.S. Pat. Nos. 5,621,064 and 4,413,079). Typically, films produced with these types of uretdione crosslinkers, however, do not have optimal film properties such as hardness, flexibility, solvent resistance, corrosion resistance, weatherability and gloss.

Another problem with powder coating compositions is that they frequently have low glass transition temperatures ($T_g$) and will agglomerate or sinter when stored at elevated temperatures for a prolonged duration of time. This phenomena causes an application problem when the powder coating composition taken from storage is agglomerated and requires remilling, which may or may not permit application of a powder coating having a suitable particle size.

It is an object of the invention to provide a powder coating composition which has a relatively high glass transition temperature and that will resist agglomeration during storage.

It is an object of the invention to provide a powder coating composition which will maximize film properties such as hardness, flexibility, solvent resistance, corrosion resistance, weatherability and gloss, yet also provide a coating composition with a relatively high lass transition temperature.

It is another object of the invention to provide a powdered coating composition which can be cured at temperatures as low as about 160° C. without the use of an effective amount of urethane catalyst or at temperatures less than about 160° C. with the use of an effective amount of urethane catalyst such as 1,5-diazabicyclo(4.3.0)non-5-ene, 1,8-diazabicyclo(5.4.0)undec-7-ene, dibutyltin dilaurate, butane stannoic acid, dibutyltin oxide, and others known in the art.

It is yet another object of the invention to provide a thermosetting powder coating composition that includes crosslinker that does not release a blocking agent into the environment upon curing.

It is another object of the invention to provide a powder coating composition with 0T bend performance, and accelerated cure schedules at temperatures greater than about 160° C. which are typical requirements for coil coating applications.

It is another object of the invention to provide a powder coating composition with a desirable melt viscosity.

Other objects, advantages, features and characteristics of the present invention will become more apparent upon consideration of the following description and the appended claims.

SUMMARY OF THE INVENTION

The present invention provides a powder coating composition that will not readily agglomerate during storage and can be cured at temperatures as low as about 160° C. without the use of an urethane catalyst, and at temperatures less than about 160° C. with the use of urethane catalyst. Moreover, the present invention has an additional advantage of utilizing crosslinking agents, which when unblocked, do not release blocking agents into the environment.

The powder coating composition of the invention comprises a unique combination of a branched oligoester polyol and crosslinking agent which when cured results in a coating with desirable hardness, flexibility, solvent resistance, corrosion resistance, weatherability and gloss. The branched oligoester polyol has a unique combination of branched structure, number average molecular weight, hydroxyl number, and acid number which provides a relatively high glass transition temperature, and hence, agglomeration resistance. When the latter branched oligoester polyol is cured with an uretdione, the combination of branched oligoester polyol and uretdione provides a coating with good performance characteristics without the production of volatile organic compounds (VOCs) with or without the use of urethane catalysts. The invention provides an increase in reactivity and high rate of cure at lower temperatures without VOCs and without sacrificing storage stability because of agglomeration or sintering.

The branched oligoester polyol has a Tg of at least about 40° C. to about 80° C., a number average molecular weight of from about 1000 to about 7500 daltons, a hydroxyl functionality of about 1.5 to about 5.0, a hydroxyl number of from about 15 to about 250 and an acid number of about 1 to about 25, and in an very important aspect, an acid number of about 5 to about 7. In another important aspect, the branched oligoester will have a viscosity of from about 20 to about 90 poise at about 200° C.

The powder coating composition of the invention comprises the branched oligoester polyol and uretdione powder coating crosslinking agent each in relative amounts which are effective for providing crosslinked coating compositions with a pencil hardness of at least about HB, a direct impact resistance of at least about 80 in lb and a reverse impact resistance of at least about 80 in lb at a binder thickness of about 0.8 to about 4 mils when curing is conducted at temperatures below about 160° C. and up to about 350° C. The powder coating composition of the invention which comprises the branched oligoester polyol and uretdione has a Tg of from about 40° C. to about 80° C. In an important aspect the powder coating composition comprises from about 40 to about 97 weight percent of the branched hydroxyl terminated oligoester, based on the weight of branched oligoester polyol and crosslinking agent.

The branched oligoester polyol may be synthesized by forming a generally linear hydroxyl terminated oligoester diol by reacting a diol and a diacid and then reacting the resulting hydroxyl terminated oligoester diol with less than a stoichiometric amount (relative to the hydroxyls on the oligoester) of a polyacid having a carboxyl functionality of at least about 3. This less than stoichiometric amount provides some carboxyl groups to the oligomer, but its more important purpose is to generally provide complex branching of the oligoester polyol so that oligomer chains extend in some cases, from all of the carboxyl functionality of the polyacid and some of the polyacids are interconnected by oligomer chains. In an important aspect, the carboxyl functionality from the polyacid reacted with the oligoester is not more than about 15% of the equivalents of the stoichiometric amount of carboxyl equivalent needed to react with all of the hydroxyl groups of the oligoester. In an important aspect, the ratio of hydroxyl terminated oligoester diol to triacid is from about 9.0:1 to about 30:1, preferably about 10:1 to about 20:1.

In an important aspect of the invention, the hydroxyl terminated diol is the reaction product of an aliphatic diol (open chain or cycloaliphatic) and an aromatic diacid, diacid halide, or diacid anhydride, such as terephthalic acid, which provides a hydroxyl terminated oligoester diol having aromatic groups. Alternatively in this aspect, the acid may be a straight chain or cycloaliphatic diacid, diacid anhydride or diacid halide, and the diol may be hydroquinone to provide the oligoester with aromatic monomers along its main chain.

In another important aspect, the diol used for the oligoester diol is a straight chain aliphatic or cycloaliphatic diol and the diacid is a cycloaliphatic diacid, diacid anhydride, or diacid halide, which monomers provide an oligoester diol having cycloaliphatic groups.

In yet another aspect, if the diacid, diacid anhydride or halide and diol used to make the oligoester diol are both straight chain, an aromatic monomer having hydroxyl and carboxyl functionality may be used to improve properties of the ultimate coating composition. These aromatic monomers having hydroxy and carboxyl functionality include ortho, meta, and parahydroxybenzoic acid. While not intending to be bound by any theory, it appears that the ring and straight chain combination, or aromatic cycloaliphatic combination provide desired film properties.

The hydroxyl terminated oligoester diol is the reaction product of excess diol with a diacid. The diol may be one or more diols selected from the group consisting of neopentyl glycol, 1,6 hexane diol, 2-butyl-2-ethyl-1,3-propane diol, 1,4 cyclohexanedimethanol, diethylene glycol, 1,3 propanediol, hydrogenated bisphenol A, 2,3,4,4-tetramethyl-1,3-cyclobutanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, thiodiethanol, 1,2-cyclohexanedimethanol, 1,3-cyclohexanedimethanol, 1,4-xylylenediol, ethoxylated bisphenol A, ester diol 204 (Union Carbide), 3-hydroxy-2,2-dimethylproprionate, unoxol 6 diol, methyl propanediol, 2-methyl-1,3-propane diol, hydroxypivalyl hydroxypivalate (HPHP), vinyl cyclohexanediol, dipropylene glycol, ester diols, dimethylol proprionic acid (DMPA), and mixtures thereof.

The aromatic acids/anhydrides/acid halides used in the invention are selected from the group consisting of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, and mixtures thereof.

Aliphatic acids/anhydrides/acid halides useful in the present invention are selected from the group consisting of fumaric acid, adipic acid, azelaic acid, sebacic acid, dodecanoic acid, glutaric acid, succinic acid, oxalic acid, itaconic acid, dimer fatty acids, maleic anhydride, succinic anhydride, chlorendic acid, diglycolic acid, nadic acid, and mixtures thereof.

Cycloaliphatic acids/anhydrides/acid halides used in the invention may include acids/anhydrides such as 1,4-cyclohexane diacid, 1,3-cyclohexane dicarboxylic acid, hexahydrophthalic anhydride, dimethyl cyclohexane dicarboxylate, and mixtures thereof. Mixtures of these compounds may also be used for the preparation of the ester diols.

Aromatic diols or dihydroxy phenolic compounds which may be used to make the oligoester diol include hydroquinone, catechol, resorcinol, p,p'-dihydroxy diphenyl methane, bisphenol A, p,p'-dihydroxy diphenyl ketone, p,p'-dihydroxydiphenyl, and mixtures thereof. Typically when such phenolic type dihydroxy compounds are used to make the oligoester diols, base catalysis is typically required.

The reaction which forms the hydroxyl terminated oligoester diol is conducted for a time and temperature effective to provide an oligoester diol having a number average molecular weight in the range of from about 400 to about 1500 daltons and then the reaction is slowed by cooling to about 170° C. to about 200° C. to provide the latter oligoester diol. Generally, the reaction which provides the oligoester diol is conducted at a temperature of about 240° C. for about 4 to about 15 hours before the reaction is cooled.

This relatively low molecular weight hydroxyl terminated oligoester diol then is reacted with the polyacid/anhydride/polyols or mixtures thereof selected from citric acid, pyromellitic anhydride, trimellitic anhydride, trimethylolpropane, trimethyolethane, pentaerythritol, and ditrimethyolpropane. In an important aspect of the invention, the polyacid or triacid which is reacted with the hydroxyl terminated oligoester diol is an aromatic acid. The branching reaction is conducted for a time and temperature effective for providing the branched oligoester polyol described herein. The reaction which forms the branched oligoester polyol is conducted at a temperature of about 180° C. to about 240° C. for about 4 to about 15 hours.

Uretdione is an important crosslinking agent in the present invention. The amount of crosslinking agent in the composition is effective for providing an equivalent ratio of isocyanate groups to hydroxyl groups of from about 0.5:1 to about 1.8:1.

In an important aspect of the invention, the uretdione has the following structure

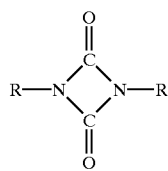

where R can include compounds from the monomeric diisocyanates such as 4,4'-diisocyanatodicyclohexylmethane, 1,4-diisocyanatobutane, 1-isocyanato-3,3,5-trimethyl-5-isocyanatomethylcyclohexane, 1,3- and 1,4-phenylene diisocyanate, naphthylene-1,5-diisocyanate, 2,4- and/or 2,6-toluylene diisocyanate, diphenylmethane-2,4'- and/or 4,4'1-diisocyanate, 1,3- and 1,4-diisocyanatocylohexane, 1,6-diisocyanatohexane, 1,10-diisocyanatodecane, 2,2,4-and 2,4,4-trimethyl-1,6-diisocyanatohexane, 1,5-diisocyanato-2,2-dimethylpentane, and others known in the art.

The uretdione structure is a result of the catalytic dimerization of monomeric diisocyanates, which are separated from the unreacted excess-isocyanate monomer in the presence of a catalyst. The unreacted isocyanate groups of the uretdione structure are then chain extended with ester diols. A typical uretdione structure may be the dimerization product of 1-isocyanato-3,3,5-trimethyl-5-isocyanatomethyl cyclohexane (isophorone diisocyante; IPDI). Typical functionality of these oligomers is approximately 2. The known uretdione dimer is thermally cleaved in the presence of a catalyst at lower temperatures to yield a cured powder coating at a low temperature bake schedule. Uncatalyzed uretdione dimers typically thermally cleave at approximately 160° C. to further react with the hydroxyl groups of the branched oligoester polyol in forming a cured powder coating composition. Catalyzed uretdione dimers in a powder coating thermally cleave at temperatures less than 160° C. to further react with the hydroxyl groups of the branched oligoester polyol in forming a cured powder coating composition.

Cleavage of the uretdione ring in the presence of hydroxyl functional reactants is initiated at temperatures as low as about 160° C. and curing of the powder coating composition proceeds without the need for an effective amount of polyurethane catalysts. Generally, less than about 0.02 weight percent urethane catalyst, based on the weight of the powder coating composition, is not effective for urethane catalysis and does not increase reaction rates. The uretdione, when mixed with branched oligoester polyol and cured, does not emit any volatiles as the uretdione ring opens to generate isocyanate (NCO) groups to crosslink with hydroxyl groups of the branched oligoester to give cured powder coatings. In an important aspect, when uretdione is used as the crosslinking agent in the composition, the composition contains from about 3 to about 60 weight percent uretdione powder coating crosslinking agent, based on the weight of branched oligoester polyol and crosslinking agent.

In another important aspect, the present invention further provides a process for the preparation of powder coating compositions wherein the branched oligoester polyol prepared as described herein, is blended with a uretdione powder coating crosslinking agent, and optionally with auxiliary substances conventionally used in the manufacture of powder coatings.

DETAILED DESCRIPTION OF THE INVENTION

Definitions

As used herein "coating binder" is the polymeric portion of a coating film after baking and after crosslinking.

"Polymeric vehicle" means all polymeric and resinous components in the formulated coating; i.e. before film formation. Pigments and additives may be mixed with the polymeric vehicle to provide a formulated powder coating composition.

"Diol" is a compound with two hydroxyl groups. "Polyol" is a compound with two or more hydroxyl groups.

"Diacid" is a compound with two carboxyl groups. "Polyacid" is a compound with two or more carboxyl groups and may be an acid or acid anhydride.

A "film" is formed by application of the powder coating composition to a base or substrate, and subsequent crosslinking.

"Sintering" means the loss of particulate characteristics of the powder during storage resulting in lumps and agglomeration or, in extreme cases, a solid mass. Amounts of material are used in the composition of the present invention which are effective for providing a powdered coating that is substantially nonsintered. "Substantially non sintered" means that after exposure of a powder to a given set of conditions, after cooling, to room temperature, it retains its particulate characteristics with only a few lumps which can be readily broken up with moderate pressure.

A "catalyst" is defined as an additive to a resin/curative or powder coating composition at a desired concentration level which accelerates the chemical reaction at a prescribed temperature and pressure. The type of catalyst used may be described as a gas, liquid, and/or solid. A solid catalyst may be mounted on a support/carrier to provide a defined concentration level per weight of catalyst for a prescribed level of activity. The catalysts described are not limited only to esterification, transesterification, and urethane cure chemistries.

"Polyester" means a polymer which has

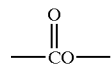

linkages in the main chain of the polymer. "Oligomer" means a compound that generally has repeating monomeric units and is similar to a polymer, but has a number average weight not greater than about 7500 daltons with or without repeating monomeric units. A "polymer" will have a number average molecular weight of over about 7500 daltons.

Acid number or acid value means the number of milligrams of potassium hydroxide required for neutralization of free acids present in 1 g of resin.

"Hydroxyl number" or "hydroxyl value" which is also called "acetyl value" is a number which indicates the extent to which a substance may be acetylated; it is the number of milligrams of potassium hydroxide required for neutralization of the acetic acid liberated on saponifying 1 g of acetylated sample.

Branched Hydroxyl Terminated Oligoester Resin

Both the Tg and melt viscosity of the resin are greatly influenced by the choice of monomers. In an important aspect of the invention, the branched hydroxyl terminated oligoester resin is made by a two stage process. In stage one, a hydroxyl terminated oligoester diol is prepared, and in stage two a branched hydroxyl terminated oligoester polyol is formed.

Stage One: In stage one, a hydroxyl terminated oligoester diol is formed through the esterification or condensation reaction of a stoichiometric molar excess of a diol (relative to the carboxyls on the acid) with a dicarboxylic acid, dicarboxylic acid anhydride or dicarboxylic acid halide such as an acid chloride.

(1) Diols which may be used in the reaction may be selected from the group consisting of neopentyl glycol, 1,6 hexane diol, 2-butyl-2-ethyl-1,3-propane diol, 1,4 cyclohexanedimethanol, diethylene glycol, 1,3 propanediol, hydrogenated bisphenol A, 2,3,4,4-tetramethyl-1,3-cyclobutanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, thiodiethanol, 1,2-cyclohexanedimethanol, 1,3-cyclohexanedimethanol, 1,4-xylylenediol, ethoxylated bisphenol A, ester diol 204 (Union Carbide), 3-hydroxy-2,2-dimethylproprionate, unoxol 6 diol, methyl propanediol, 2-methyl-1,3-propane diol, hydroxypivalyl hydroxypivalate (HPHP), vinyl cyclohexanediol, dipropylene glycol, ester diols, dimethylol proprionic acid (DMPA), and mixtures thereof.

Aromatic diols such as hydroquinone, catechol, resorcinol, p,p'-dihydroxy diphenyl methane, bisphenol A, p,p'-dihydroxy diphenyl ketone, p,p'-dihydroxydiphenyl, and mixtures thereof, also may be reacted with straight chain or cycloaliphatic diacids.

(2) Aromatic diacids, aliphatic diacids and/or cycloaliphatic diacids or anhydrides or acid halides may be used to make the hydroxyl terminated diols.

In an important aspect, the aromatic acid/anhydride/acid halide is selected from the group consisting of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, and mixtures thereof, or acid halides thereof.

Aliphatic acid/anhydrides/acid halides which may be used in the invention include fumaric acid, adipic acid, azelaic acid, sebacic acid, dodecanoic acid, glutaric acid, succinic acid, oxalic acid, itaconic acid, dimer fatty acids, maleic anhydride, succinic anhydride, chlorendic acid, diglycolic acid, nadic acid, and mixtures thereof.

Cycloaliphatic acid/anhydrides/acid halides which may be used in the invention include acids/anhydrides such as 1,4-cyclohexane diacid, 1,3-cyclohexane dicarboxylic acid, hexahydrophthalic anhydride, dimethyl cyclohexane dicarboxylate, and mixtures thereof.

Mixtures of these compounds may also be used for the preparation of the ester diols as mixed functional intermediates. Ester diols are those prepared in a known manner from lactones and dihydric alcohols as starter molecules through a ring opening reaction. The preparation of ester diols may include lactones such as β-propiolactone, γ-butyrolactone, γ- and delta-valerolactone, ε-caprolactone, 3,5,5, - and 3,3,5-trimethylcaprolactone or mixtures thereof. Suitable starter molecules include the described dihydric alcohols listed.

In a very important aspect of the invention, the aromatic acid is one or more aromatic acids selected from the group consisting of terephthalic acid (TPA), isophthalic acid (IPA), and t-butyl isophthalic acid. These are reacted with an aliphatic or cycloaliphatic diol such as neopentyl glycol, 1,6 hexane diol, 2-butyl-2-ethyl, 1,3-propanediol, and 1,4-cyclohexane dimethanol.

The diol component and diacid component are each present in amounts effective for providing the coating composition and subsequent coating with the properties described. In an important aspect of the invention, the combination of neopentyl glycol and 1,6 hexane diol in a molar ratio of about 4.0:1 to about 7.0:1, preferably about 5.6:1, is reacted with TPA, IPA or t-butyl isophthalic acid provides a coating composition with an acceptable Tg.

The reaction to obtain hydroxyl terminated oligoester diol may be conducted at about 240° C. for about 4 to about 15 hours and then is cooled to obtain the generally linear product having the Mn of from about 400 to about 1500 daltons. If an aliphatic acid is reacted with an aromatic dihydroxyl compound such as hydroquinone, catechol, resorcinol, p,p'-dihydroxy diphenyl methane, bisphenol A, p,p'-dihydroxy diphenyl ketone, p,p'-dihydroxydiphenyl, and mixtures thereof, the use of base catalysts typically are required.

Stage Two: In stage two, the hydroxyl terminated oligoester diol prepared in stage one is reacted to form a branched hydroxyl terminated oligoester polyol. In an important aspect of the invention, the hydroxyl terminated oligoester prepared in stage one is reacted with a polyacid/anhydrides or blend of polyacids/anhydrides which are at least a triacid. The triacid, or triacid blend is selected from the group consisting of trimellitic anhydride (TMA) and citric acid. In a very important aspect, the triacid is an aromatic acid such as trimellitic anhydride.

In an important aspect of the invention, the resulting branched hydroxyl terminated oligoester has a hydroxyl functionality of about 1.5 to about 5.0, a hydroxyl number of from about 15 to about 250, an acid value of about 1 to about 25, and a number average molecular weight in the range of from about 1000 to about 7500 daltons. The branched hydroxyl terminated oligoester has a Tg of at least about 40° C., and in an important aspect from about 40° C. to about 80° C. In a very important aspect, the ratio of hydroxyl terminated oligoester to polyacid is about 9.0:1 to about 30:1.

Crosslinking Agents

Uretdione Crosslinkers: In an important aspect of the invention, the uretdione crosslinker is an internally blocked isocyanate or a dimer of an isocyanate. Examples of uretdione crosslinkers acceptable for use in the present invention include Crelan LS2147 (Bayer), and Alcure 4147 (McWhorter Technologies). The preparation of uretdione crosslinking agent provides an average NCO functionality, based on the free NCO groups, of about 1.9. The free NCO content is typically less than about 1%. In a very important aspect, the powder coating composition will include about 3 to about 60 weight percent uretdione crosslinking agent, based on the weight of the branched hydroxyl terminated oligoester polyol and crosslinking agent.

Preparation and Application of the Thermosetting Powder

For the preparation of the thermosetting powder compositions, the branched hydroxyl terminated oligoester resin, the crosslinking agent and various auxiliary substances conventionally used for the manufacture of powder coatings and paints are mixed homogeneously. This homogenization is carried out for example by melting the oligoester, the crosslinking agent and the various auxiliary substances at a temperature within the range of from about 70° to about 130° C., preferably in an extruder, for example a Buss-Ko-Kneader extruder or a twin-screw extruder of the Werner-Pfleiderer or Baker Perkins type. The extrudate is then allowed to cool, is ground and sieved to obtain a powder suitable for electrostatic or fluidized bed application.

Another factor affecting viscosity and flow is the level of pigmentation and fillers in the system. High levels of pigmentation and/or fillers detract from the flow of the system by increasing the melt viscosity. Fine particle size organic pigments such as carbon black, phthalocyanine blue and quinacridones cause a significant increase in melt viscosity even at low levels.

The auxiliary substances which can be added to the thermosetting powder compositions according to the invention include ultraviolet light absorbing compounds such as Tinuvin 900 (from CIBA-GEIGY Corp.), light stabilizers based on sterically hindered amines (for example Tinuvin 144 from CIBA-GEIGY Corp.), phenolic antioxidants (for example Irganox 1010 and Irgafos from CIBA-GEIGY Corp.) and stabilizers of the phosphonite or phosphite type. A variety of pigments may also be added to the thermosetting powder compositions according to the invention. Examples of pigments that may be employed in the invention are metal oxides such as titanium dioxide, iron oxide, zinc oxide and the like, metal hydroxides, metal powders, sulfides, sulfates, carbonates, carbon black, iron blues, organic reds, organic yellows, organic maroons and the like. Auxiliary substances may also include flow control agents such as Resiflow PV5 (from WORLEE), Modaflow 3 and 2000 (from MONSANTO), Acronal 4F (from BASF), Resiflow P-67 (from Estron), plasticizers such as dicyclohexyl phthalate, triphenyl phosphate, grinding aids and degassing agents such as benzoin. Examples of fillers are calcium carbonate, magnesium carbonate, blanc fixe, barytes, silicates, talc, china clay and the like. These auxiliary substances are added in conventional amounts, it being understood that if the thermosetting powder compositions of the inventions are used as clear coatings, opacifying auxiliary substances should be omitted.

In addition, urethane catalysts can also be mixed with the thermosetting powder composition of the invention. Catalysts useful in the present invention include 1,5-diazabicyclo(4.3.0)non-5-ene, 1,8-diazabicyclo(5.4.0)undec-7-ene, dibutyltin dilaurate, butane stannoic acid, dibutyltin oxide, stannous oxide, and others known in the art.

The powder coating compositions which are the subject matter of the present invention are suitable to be applied on articles to be coated by, but not limited to conventional techniques, e.g. by application by means of an electrostatic or tribostatic spray gun; Powder Cloud technology (Material Sciences Corporation) or by the well-known fluidized bed coating technique. In an important aspect, the composition of the present invention can be used to supply very thick coatings.

After having been applied on the article in question, the deposited coatings are cured by heating in an oven. In an important aspect, curing without catalyst is effected at a temperature of as low as about 160° C. for about less that 35 minutes in order to obtain sufficient crosslinking to provide the described coating properties. Alternatively, desirable coating properties can be obtained by curing at a temperature of about 200° C. for about 5 minutes, heating at about 180° C. for about 15 minutes, and coil coating by heating at about 350° C. for about 40 seconds. Curing by infrared (IR) or induction heating is also applicable. In the aspect of the invention where urethane catalyst is used, desirable coating properties can be obtained by curing at a temperature as low as about 130° C. for about 10 to about 30 minutes.

The following examples illustrate methods for carrying out the invention and should be understood to be illustrative of, but not limiting upon, the scope of the invention which is defined in the appended claims.

EXAMPLES

Example 1

Stage 1
Preparation of Hydroxyl Terminated Oligomer

| Reactant | Weight |
| --- | --- |
| Neopentyl Glycol (Eastman) | 805 gms |
| 1,6 hexanediol (UBE) | 161 gms |
| Terephthalic acid (Amoco) | 1145 gms |
| Butylchlorotin dihydroxide (Elf-Atochem) | 2.1 gms |
| Antioxidant (Weston 618-General Electric) | 4.6 gms |

The mixture was heated gradually to 205° C. and then processed at 240° C. to an acid value of 4 to 7 mg KOH/gram resin with an ICI cone and plate viscosity of 10–14 poise at 125° C. The hydroxyl number of this oligomer was found to be about 130–140 mg KOH/gram resin.

Stage 2
Preparation of Hydroxyl Terminated Branched Oligoester
The above oligomer was cooled to 180° C. and 153.5 gms of trimellitic anhydride were added. The temperature was raised to 210–215° C. and vacuum was slowly applied over a 50 minute period until a vacuum of 23–24 inches of mercury was obtained. The reaction was monitored by regularly taking a sample and determining the acid number and ICI cone and plate viscosity @ 200° C. When an ICI cone and plate viscosity of 50–60 poise and an acid value of 4–10 mg KOH/gram resin were obtained, the melt was cooled down to 195° C. and discharged from the flask. The color of the resin was nearly colorless/transparent to light yellow in color. Further examples of the hydroxyl terminated branched oligoester are shown in table 1.

Example 2

Preparation of Powder Coatings
All oligoesters were made into a high gloss, white powder coating prepared as follows:

| | |
| --- | --- |
| Oligoester Resin of Example 1 | 1000 grams |
| Alcure 4147 (McWhorter Technologies) | 310 grams |
| Modaflow 2000 (flow leveling agent-Monsanto) | 15 grams |
| Benzoin (degassing agent) | 6 grams |
| Titaniuin Dioxide (Dupont R-960) | 450 grams |

All the above ingredients are initially mixed in a high speed mill such as a Welex mixer, where a homogeneous mix is obtained. The resulting mix was processed through a twin screw extruder (ZSK 30 Werner-Phleider) with Zone 1 at 80° C. and Zone 2 at 122° C. The resulting melt was discharged onto a pair of water cooled squeeze rolls, from which the emerging cooled sheet was roughly crushed prior to pulverizing in a Brinkman grinding mill. The resulting powder was sieved through a 100 mesh screen. This powder coating was electrostatically sprayed onto ground steel panels. The physical properties of the formulated powder coating are determined after a 5 minute cure at 200° C. for 1.5–2.2 mils film thickness. The composition and the test results of these powder coatings are given in Table 2.

TABLE 1

Composition and Properties of the Oligoesters

| Composition (grams) | 1 | 2 | 3 | 4 | 5 | 6 | 7 |
|---|---|---|---|---|---|---|---|
| Neopentyl Glycol | 953 | 881 | 881 | 878 | 809 | 806 | 804 |
| 1,6 Hexane diol | — | 80 | 80 | 80 | 161 | 160 | 160 |
| Terephthalic Acid | 1145 | 1144 | 1144 | 1140 | 1145 | 1138 | 1135 |
| Butylchlorotin Dihydroxide | 2.26 | 2.26 | 2.26 | 2.26 | 2.26 | 2.26 | 2.26 |
| Weston 618 | 4.52 | 4.52 | 4.52 | 4.52 | 4.52 | 4.52 | 4.52 |
| Trimelletic Anhydride | 161.00 | 163.00 | 163.00 | 171.00 | 155.00 | 163.00 | 171.00 |
| Total | 2265.78 | 2274.78 | 2274.78 | 2275.78 | 2276.78 | 2273.78 | 2276.78 |
| —H$_2$O | 265.78 | 274.78 | 274.78 | 275.78 | 276.78 | 273.78 | 276.78 |
| Yield | 2000.00 | 2000.00 | 2000.00 | 2000.00 | 2000.00 | 2000.00 | 2000.00 |
| RESIN PROPERTIES | | | | | | | |
| Acid Number | 10.1 | 8.3 | 7.2 | 9.5 | 5.2 | 7.4 | 9.3 |
| Hydroxyl Number | 60 | 55 | 62 | 65 | 64 | 64 | 64 |
| ICI Visc @ 200° C. | 55 | 62 | 62 | 57 | 52 | 55 | 61 |
| Glass Transition Temp ° C. | 66 | 59 | 60 | 59 | 51 | 53 | 52 |
| Number Av. Mol. Wt. (GPC) | 2950 | 3140 | 3666 | 3190 | 3123 | 3179 | 3042 |

TABLE 2

Film Evaluation of the Oligoesters

| Resin | 1 | 2 | 3 | 4 | 5 | 6 | 7 | 30–3000 Control | Competitive Resin 1 | Competitive Resin 2 |
|---|---|---|---|---|---|---|---|---|---|---|
| Gloss | | | | | | | | | | |
| 60° | 92 | 92 | 90 | 92 | 92 | 89 | 90 | 90 | 91 | 88 |
| 20° | 82 | 80 | 72 | 76 | 77 | 75 | 76 | 76 | 78 | 66 |
| Impact Resistance in lb | | | | | | | | | | |
| Direct | 160 | 160 | 160 | 160 | 160 | 160 | 160 | 80 | 160 | 160 |
| Reverse | 160 | 160 | 160 | 160 | 160 | 160 | 160 | 10 | 160 | 160 |
| MEK Rubs* (50 double rubs) | 4 | 4 | 4 | 3 | 3.5 | 4 | 4 | 3 | 3.5 | 3 |
| Flow/Leveling** | 6 | 6 | 6 | 6 | 6 | 6 | 6 | 7 | 4 | 2 |
| Gel time 400° F. secs | 89 | 90 | 83 | 77 | 94 | 80 | 77 | 92 | 98 | 47 |
| 45° Inclined Plate Pill Flow @ 375° F. mm | 150 | 148 | 126 | 147 | 145 | 139 | 126 | 150 | 150 | 98 |

*Judged visually on a scale of 0–5 in which
0 = very bad
5 = excellent
**PCI flow standards on a scale of 1–10 in which
1 = poor flow
10 = Smooth Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A powder coating composition comprising:
   a branched hydroxyl terminated oligoester polyol which has a hydroxyl value in the range of from about 15 to about 250, an acid number of about 1 to about 25, and a number average molecular weight in the range of from about 1000 to about 7500 daltons, wherein the branched hydroxyl terminated oligoester polyol is the reaction product of a hydroxyl terminated oligoester diol and a polyacid or anhydride having a carboxyl functionality of 3 or greater; and
   a uretdione crosslinking agent, the branched hydroxyl terminated oligoester polyol and crosslinking agent each being in relative amounts effective for curing the powder coating composition at a temperature of about 160° C. without the use of an effective amount of urethane catalyst and at a temperature of less than 160° C. with the use of a urethane catalyst to provide a cured coating having a pencil hardness of about HB or greater, a direct impact resistance of about 80 in lb or greater and a reverse impact resistance of about 80 in lbs or greater at a cured film thickness of about 0.8 to about 4.0 mils,
   the coating composition having a Tg of about 40° C. or greater.

2. A powder coating composition as recited in claim 1, wherein the equivalent ratio of hydroxyl terminated oligoester diol to polyacid or anhydride is from about 9:1 to about 30:1.

3. A powder coating composition as recited in claim 2, wherein the hydroxyl terminated oligoester diol is the reaction product of a diol reactant and a diacid reactant selected from the group consisting of an open chain aliphatic dicarboxylic acid, a cycloaliphatic dicarboxylic acid, an aromatic dicarboxylic acid, an open chain aliphatic dicarboxylic acid anhydride, a cycloaliphatic dicarboxylic acid anhydride, an aromatic dicarboxylic acid anhydride, an open chain dicarboxylic acid halide, a cycloaliphatic dicarboxylic acid halide, an aromatic dicarboxylic acid halide and mixtures thereof, the reaction of the diol reactant and the diacid reactant at a time and temperature effective for providing the hydroxyl terminated oligoester diol having a molecular weight in the range of from about 400 to about 1500 daltons.

4. A powder coating composition as recited in claim 3 wherein the diol reactant is selected from the group consisting of neopentyl glycol, 1,6 hexane diol, 2-butyl-2-ethyl-1,3-propane diol, 1,4 cyclohexanedimethanol, diethylene glycol, 1,3 propanediol, hydrogenated bisphenol A, dimethylol propionic acid, 2,3,4,4-tetramethyl-1,3-cyclobutanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, thiodiethanol, 1,2-cyclohexanedimethanol, 1,3-cyclohexanedimethanol, 1,4-xylylenediol, ethoxylated bisphenol A, methyl propanediol, 2-methyl-1,3-propane diol, hydroxypivalyl hydroxypivalate, vinyl cyclohexanedibl, dipropylene glycol, dimethylol propionic acid, aromatic diol compounds and mixtures thereof.

5. A powder coating composition as recited in claim 4, wherein the diacid reactant includes aromatic diacid reactant and the aromatic diacid reactant is an aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, or mixtures thereof.

6. A powder coating composition as recited in claim 4, wherein the diacid reactant includes an open chain aliphatic diacid reactant where the open chain aliphatic diacid reactant is the open chain aliphatic acid, acid anhydride or acid halide of fumaric acid, adipic acid, azelaic acid, sebacic acid, dodecanoic acid, glutaric acid, succinic acid, oxalic acid, itaconic acid, dimer fatty acids, maleic acid, succinic acid, chlorendic acid, diglycolic acid, nadic acid, or mixtures thereof.

7. A powder coating composition as recited in claim 4, wherein the diacid reactant includes a cycloaliphatic diacid reactant and the cycloaliphatic diacid reactant is the cycloaliphatic acid, the cycloaliphatic anhydride or cycloaliphatic acid halide of 1,4-cyclohexane dicarboxylic acid, 1,3-cyclohexane dicarboxylic acid, hexahydrophthalic acid, dimethyl cyclohexane dicarboxylic acid or mixtures thereof.

8. A powder coating composition as recited in claim 5, wherein the diol reactant is selected from the group consisting of neopentyl glycol, 1,6 hexane diol, 2-butyl-2-ethyl-1,3-propane diol, 1,4 cyclohexanedimethanol, and mixtures thereof.

9. A powder coating composition as recited in claim 8, wherein the diacid reactant is an aromatic acid, anhydride or acid halide of an aromatic acid selected from the group consisting of terephthalic acid, isophthalic acid, t-butyl isophthalic acid, and mixtures thereof.

10. A powder coating composition as recited in claim 1, wherein the oligoester ester diol is the reaction product of a lactone selected from the group consisting of β-propiolactone, γ-butyrolactone, γ- and 3,3,5-trimethylcaprolactone and mixtures thereof, and a dihydric compound.

11. A powder coating composition as recited in claims 1, 2, 5, 8 or 9 wherein the polyacid or anhydride is a triacid.

12. A powder coating composition as recited in claim 11, wherein the triacid is selected from the group consisting of trimellitic anhydride, citric acid, and mixtures thereof.

13. A powder coating composition as recited in claim 11, wherein the triacid is trimellitic anhydride.

14. A powder coating composition as recited in claim 1, wherein the branched hydroxyl terminated oligoester polyol has a hydroxyl functionality of about 1.5 to about 5.0.

15. A powder coating composition as recited in claims 1 or 2, wherein the powder coating composition has about 40 to about 97 weight percent branched hydroxyl terminated oligoester polyol, based on the weight of the branched hydroxyl terminated oligoester polyol and crosslinking agent.

16. A powder coating composition as recited in claims 1 or 2, wherein the powder coating composition has about 3 to about 60 weight percent uretdione crosslinking agent, based on the weight of the branched hydroxyl terminated oligoester polyol and crosslinking agent.

17. A powder coating composition as recited in claims 3, 8 or 9 wherein the reaction that forms the hydroxyl terminated oligoester diol is cooled to about 170° C. to about 200° C. to provide the oligoester diol with the molecular weight of from about 400 to about 1500 daltons.

18. A process for preparing a powder coating composition which when applied to a substrate is effective for providing a cured coating having a $T_g$ of about 40° C. or greater, a pencil hardness of about HB or greater, a direct impact resistance of about 80 in lbs or greater and a reverse impact resistance of about 80 in lbs or greater at a cured film thickness of about 0.08 to about 4.0 mils, the process comprising:

blending a branched hydroxyl terminated oligoester polyol with a uretdione crosslinking agent to provide the powdered coating composition, wherein the branched hydroxyl terminated oligoester polyol has a hydroxyl value in the rangeof from about 15 to about 250, an acid number of about 1 to about 25, and a number average molecular weight in the range of from about 100 to about 7500 daltons, and wherein the branched hydroxyl terminated oligoester diol and a polyacid or anhydride having a carboxyl functionality of 3 or greater; and wherein the uretdione crosslinking agent is effective for providing an equivalent ratio of isocyanate groups to hydroxyl groups of from about 0.5:1.0 to about 1.8:1 and the uretdione crosslinking agent is present in an amount effective for curing the powder coating composition at temperatures of about 160° C. without the use of an effective amount of urethane catalyst and a temperatures of less than 160° C. with the use of an effective amount of urethane catalyst.

19. A process for preparing a powder coating composition as recited in claim 18, wherein the equivalent ratio of hydroxyl terminated oligoester diol to polyacid or anhydride is from about 9:1 to about 30:1.

20. A process for preparing a powder coating composition as recited in claim 19, wherein the hydroxyl terminated oligoester diol is the reaction product of a diol reactant and a diacid reactant selected from the group consisting of an open chain aliphatic dicarboxylic acid, a cycloaliphatic dicarboxylic acid, an aromatic dicarboxylic acid, an open chain aliphatic dicarboxylic acid anhydride, a cycloaliphatic dicarboxylic acid anhydride, an aromatic dicarboxylic acid anhydride, an open chain dicarboxylic acid halide, a cycloaliphatic dicarboxylic acid halide, an aromatic dicarboxylic acid halide and mixtures thereof, the reaction of the diol reactant and the diacid reactant at a time and temperature effective for providing the hydroxyl terminated oligoester diol having a molecular weight in the range of from about 400 to about 1500 daltons.

21. A process for preparing a powder coating composition as recited in claim 20, wherein the diacid reactant includes aromatic diacid reactant and the aromatic diacid reactant is an aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, or mixtures thereof.

22. A process for preparing a powder coating composition as recited in claim 20, wherein the diacid reactant includes a cycloaliphatic diacid reactant and the cycloaliphatic diacid reactant is the cycloaliphatic acid, the cycloaliphatic anhydride or cycloaliphatic acid halide of 1,4-cyclohexane dicarboxylic acid, 1,3-cyclohexane dicarboxylic acid, hexahydrophthalic acid, dimethyl cyclohexane dicarboxylic acid, or mixtures thereof.

23. A process for preparing a powder coating composition as recited in claim 20, wherein the diol reactant is selected from the group consisting of neopentyl glycol, 1,6 hexane diol, 2-butyl-2-ethyl-1,3-propane diol, 1,4 cyclohexanedimethanol, and mixtures thereof, the diacid reactant is selected from the group consisting of an aromatic diacid reactant, a cycloaliphatic diacid reactant and mixtures thereof and the aromatic diacid reactant is the aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, and mixtures thereof and the cycloaliphatic reactant is the cycloaliphatic diacid, the cycloaliphatic anhydride or cycloaliphatic acid halide of 1,4-cyclohexane dicarboxylic acid, 1,3-cyclohexane dicarboxylic acid, hexahydrophthalic acid, dimethyl cyclohexane dicarboxylic acid, or mixtures thereof.

24. A process for preparing a powder coating composition as recited in claim 23, wherein the polyacid or anhydride is a triacid.

25. A process for preparing a powder coating composition as recited in claim 24, wherein the branched hydroxyl terminated oligoester polyol has a hydroxyl functionality of about 1.5 to about 5.0.

26. A process for preparing a powder coating composition as recited in claim 24 wherein the reaction that forms the hydroxyl terminated oligoester diol is cooled to about 170° C. to about 200° C. to provide the oligoester diol with the molecular weight of from about 400 to about 1500 daltons.

* * * * *

UNITED STATES PATENT AND TRADEMARK OFFICE
CERTIFICATE OF CORRECTION

PATENT NO.   : 6,541,595 B2
DATED        : April 1, 2003
INVENTOR(S)  : Panandiker et al.

It is certified that error appears in the above-identified patent and that said Letters Patent is hereby corrected as shown below:

Column 13,
Line 25, change "cyclohexanedibl" to -- cyclohexanediol --.
Line 65, after "and" insert -- delta-valerolactone, ε-caprolactone, 3,5,5,- and --.

Column 14,
Line 39, change "rangeof" to -- range of --.
Line 43, change "100" to -- 1000 --.
Line 44, after "terminated oligoester" insert -- polyol is the reaction product of a hydroxyl terminated oligoester --.

Signed and Sealed this

Fourteenth Day of October, 2003

JAMES E. ROGAN
*Director of the United States Patent and Trademark Office*